UNITED STATES PATENT OFFICE.

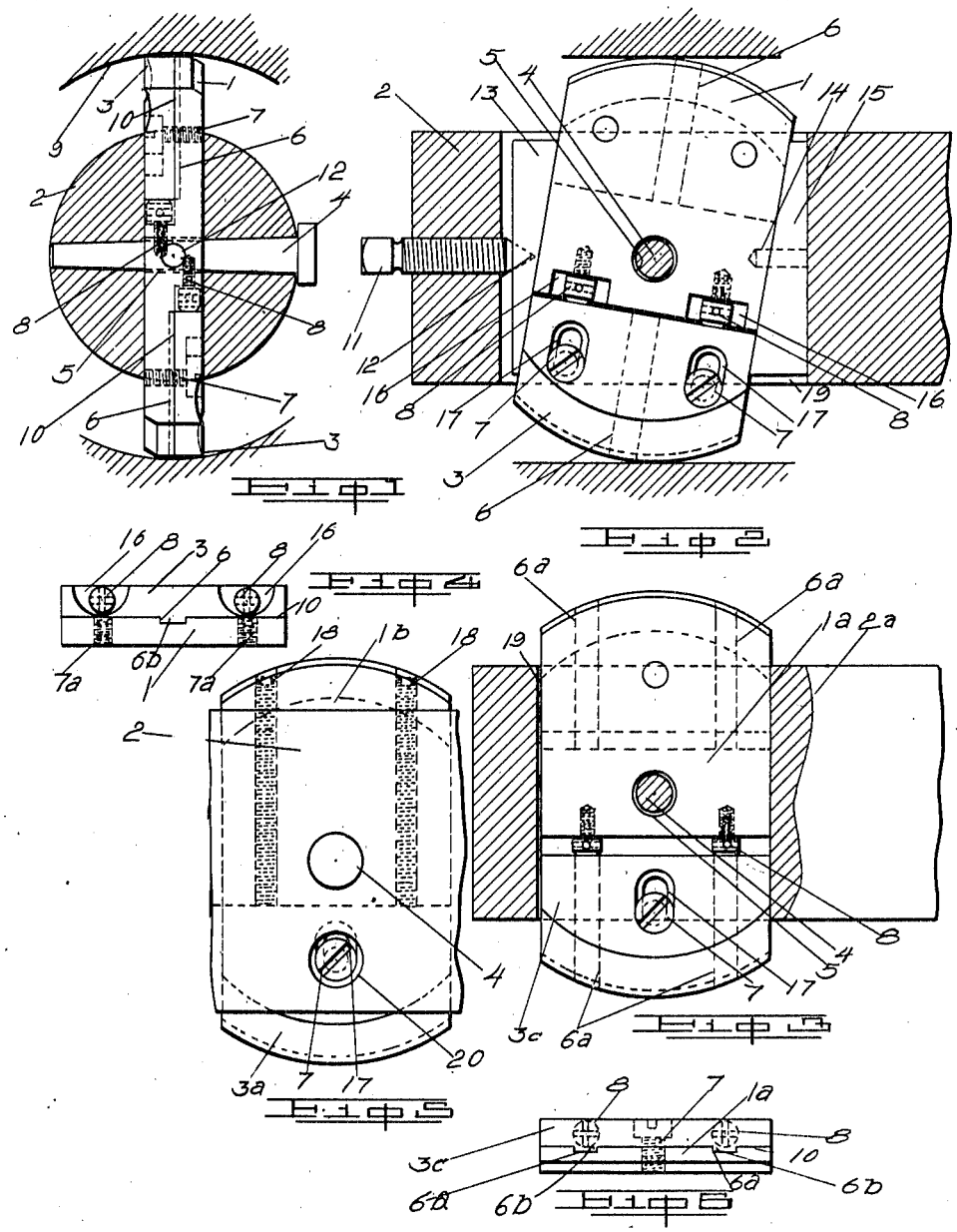

ROY F. WEEKS, OF PORTLAND, OREGON.

BORING-CUTTER.

1,096,799.   Specification of Letters Patent.   Patented May 12, 1914.

Application filed February 3, 1913. Serial No. 746,074.

*To all whom it may concern:*

Be it known that I, ROY F. WEEKS, a citizen of the United States, residing at Portland, in the county of Multnomah and State of Oregon, have invented certain new and useful Improvements in Boring-Cutters, of which the following is a specification.

This invention relates to improvements in boring cutters and has for its object to provide an easily adjusted cutter to be used in slotted boring bars. I attain this object by means of the improvements illustrated in the accompanying drawings, in which;

Figure 1 is a transverse sectional elevation through the boring bar showing the cutter in position for boring. Fig. 2 is a longitudinal sectional elevation of the same. Fig. 3 shows a modified form of cutter and bar. Fig. 4 is an end view of the cutter shown in Fig. 2. Fig. 5 is another modified form of cutter wherein the adjusting screws extend entirely through the cutter holder. Fig. 6 shows an end view of Fig. 3.

Like numerals of reference throughout the several views indicate similar parts.

Referring to the drawings, in Figs. 1, 2 and 3, the cutter is seen to consist of a holder 1, offset at 10 to receive blades 3, and provided with a guide groove 6 adapted to receive and engage a guide strip $6^b$ on blades 3. Blades 3 are provided with two longitudinal orifices 17 adapted to receive the holding screws 7 which extend into the holder 1 and hold the cutter blades in place in such manner that they may be adjusted parallel with the guide grooves 6. Recesses 16 are provided in the holder 1 for the heads of adjusting screws 8 which are screwed into the shoulder 24 of offset 10 and are used to adjust blades 3. The cutter is adapted to be held within slot 19 of boring bar 2 by means of centering pin 4 which is tapering so that it may be driven tightly into said bar 2, the cutter being provided with an orifice 5 slightly larger in diameter than pin 4 so as to allow the cutter to adjust itself centrally within the bore 9 so that both blades 3 will remove an equal amount of metal when a finishing or reaming cut is taken. It will be noted that the cutting edges of the blades 3 are of circular form, all portions of said edges being an equal distance from the center of pin 4. This allows the cutter to be partially revolved within the slot 19 so as to utilize various portions of the cutting edge. To hold the cutter at various angles, wedges 13 and 15 are provided. Wedge 15 is provided with a centering pin 14 engaging a recess in the edge of cutter holder 1. Wedge 13 is held in place by the point of screw 11 which engages a recess 12 in said wedge.

In Fig. 3 the holder $1^a$ is held within a loose fitting slot 19 without the use of wedges and is not provided with recesses 16. In this form of cutter two guide grooves $6^a$ and two strips $6^b$ are used for each blade in place of one, and only one holding screw 7 is provided for each blade. When it is found desirable to adjust the cutter without removing it from the bar, a cutter of the form shown in Fig. 5 may be used. In this form the adjusting screws 18 extend entirely through the holder $1^b$ and may be adjusted from the edge thereof. An orifice 20 is provided in bar 2 for the purpose of adjusting screw 7 which holds blade $3^a$ in place.

What is claimed is:

1. In a boring bar, an adjustable boring cutter comprising flat blades having circular cutting edges and orifices for the reception of screws, in combination with a holder adapted to fit within a boring bar slot, and provided with offsets adapted to receive the aforesaid blade and further provided with tapped holes for the reception of blade-holding screws and blade adjusting screws, blade holding screws, blade adjusting screws and means for holding the said cutter in place within the aforementioned boring bar in such manner as to allow a small amount of free transverse movement of said cutter within said boring bar slot.

2. In a boring bar, an adjustable boring cutter comprising blades having circular cutting edges and orifices for the reception of screws, a holder adapted to fit within a boring bar slot, and provided with offsets adapted to receive the aforesaid blade and further provided with tapped holes for the reception of blade holding screws and blade adjusting screws, blade holding screws, blade adjusting screws and a pin adapted to pass loosely through a hole provided in the center of said holder and adapted to fit rigidly in said boring bar so as to allow a small amount of free transverse movement of said cutter within said boring bar slot.

3. The combination in a boring bar, of an adjustable boring cutter comprising blades having circular cutting edges and provided with orifices for the reception of screws, longitudinal projecting guide-strips, a holder adapted to fit within a boring bar slot and provided with offsets adapted to receive the aforesaid blades and further provided with tapped holes for the reception of blade holding screws and blade-adjusting screws, and also provided with guide grooves adapted to receive the aforementioned guide strips, blade holding screws, blade-adjusting screws and means for holding the said cutter in place within the aforementioned boring bar in such manner as to allow a small amount of free transverse movement of said cutter within said boring bar slot.

4. The combination with a boring cutter holder having an indentation in one edge, of a wedge provided with a projecting pin in one of its edges adapted to engage said indentation, and a wedge corresponding in taper to the aforementioned wedge, adapted to fit along the edge of said holder opposite the first mentioned wedge, so as to hold the boring cutter holder at the desired angle within the slot of a boring bar.

Signed in the presence of two witnesses.

ROY F. WEEKS.

Witnesses:
H. H. HIGLEY,
F. S. HIGLEY.